(12) United States Patent
Bell et al.

(10) Patent No.: US 11,220,243 B1
(45) Date of Patent: Jan. 11, 2022

(54) RV WASTE TANK CONTROL SYSTEM

(71) Applicants: Jimmy Bell, Crestview, FL (US); David James Keener, Tulsa, OK (US)

(72) Inventors: Jimmy Bell, Crestview, FL (US); David James Keener, Tulsa, OK (US)

( * ) Notice: Subject to any disclaimer, the term of this patent is extended or adjusted under 35 U.S.C. 154(b) by 153 days.

(21) Appl. No.: 16/778,298

(22) Filed: Jan. 31, 2020

Related U.S. Application Data (60) Provisional application No. 62/799,840, filed on Feb. 1, 2019.

(51) Int. Cl.
| | |
|---|---|
| *B60S 5/00* | (2006.01) |
| *B08B 9/093* | (2006.01) |
| *B60R 16/08* | (2006.01) |
| *B60S 1/62* | (2006.01) |
| *B60P 3/32* | (2006.01) |
| *B60R 15/04* | (2006.01) |
| *B60R 15/02* | (2006.01) |

(52) U.S. Cl.
CPC ............. *B60S 5/00* (2013.01); *B08B 9/093* (2013.01); *B60R 16/08* (2013.01); *B60S 1/62* (2013.01); *B60P 3/32* (2013.01); *B60R 15/02* (2013.01); *B60R 15/04* (2013.01)

(58) Field of Classification Search
None
See application file for complete search history.

(56) References Cited

U.S. PATENT DOCUMENTS

| | | | |
|---|---|---|---|
| 4,744,385 A | 5/1988 | Houghton | |
| 4,868,932 A | 9/1989 | Thoma | |
| 4,903,716 A | 2/1990 | Stevens | |
| 4,905,325 A | 3/1990 | Colditz | |
| 5,056,544 A | 10/1991 | Stevens | |
| 5,265,544 A | 11/1993 | Bigelow | |
| 5,937,888 A | 8/1999 | McKiernan | |
| 6,000,067 A * | 12/1999 | Cascia | E03D 9/02 |
| | | | 4/222 |
| 9,908,122 B2 | 3/2018 | Cornille | |
| 2004/0094227 A1* | 5/2004 | Few | F01M 11/04 |
| | | | 141/98 |
| 2016/0023217 A1* | 1/2016 | Cornille | B60R 15/00 |
| | | | 137/2 |
| 2018/0141544 A1* | 5/2018 | Xiao | G08G 1/164 |
| 2018/0354432 A1* | 12/2018 | Van Beek | B60R 15/04 |

* cited by examiner

*Primary Examiner* — Cristi J Tate-Sims
(74) *Attorney, Agent, or Firm* — Chad Hinrichs (57) ABSTRACT

A system and method to control the cleaning and emptying of a wastewater holding tank on a Recreational Vehicle. The system has the ability to autonomously open the drain valve allowing the tank to be emptied while connected to a suitable drain hose. It also has the ability to automatically rinse the tank from an external water source—should the system be so equipped. Further, the system and method can operate a wastewater system with two or more tanks each tank having its own gate valve used to empty the tank. In, this configuration the system will only open one gate valve at a time.

14 Claims, 13 Drawing Sheets

Gate Closed Detector

RV WASTE TANK CONTROL SYSTEM

PRIORITY CLAIM

The present application claims priority to and is a continuation-in-part of U.S. Provisional Patent Application No. 62/799,840 filed on Feb. 1, 2019 and entitled RV Waste Tank Control System which is incorporated herein by reference.

FIELD OF THE INVENTION

The present invention relates generally to RV wastewater tank. More particularly, the present invention relates to an automated control system for an RV wastewater tank.

BACKGROUND OF THE INVENTION

Modern recreational vehicles such as motorhomes, travel trailers and 5th wheels, (commonly referred to as RVs), allow the operator to travel with all of the conveniences of home. That includes running water and sewer. The system that provides these conveniences typically includes a water supply (typically shore supplied water and/or a water holding tank), and one or more wastewater holding tanks. Some RVs are equipped with two or more wastewater tanks. One tank is the gray water tank. It collects water from the sinks, shower, dishwasher and washing machine. The second tank is the black water tank. It collects water and waste from the toilet. If there are additional tanks, they typically collect water and waste from another source in the RV. Each tank typically has its own drain valve for draining.

Once the water is used, it, along with any comingled waste, is held in a wastewater tank. Once the tank is full it must be drained. If it is not, the water will back up into the bathroom or kitchen from where it is flowing. Draining the wastewater tank often occurs at the most inconvenient time, such as when the occupant is using the restroom or bathing. Draining the wastewater tank requires the occupant to open the gate valve on the tank.

In some high-end RVs this can be done by manually operating an electronical drive motor or solenoid from a control panel found inside the RV. This still requires the occupant to leave the shower or restroom and stand in-front of the control panel. Even more problematic, the majority of RVs require the occupant to go outside the RV and manually operate the drain valve. This task can be extremely unpleasant when it occurs halfway through the occupant's shower in the middle of winter. Systems such as these, lack the ability to monitor the level of water in the wastewater tank and automatically empty the tank when it reaches a high or full level. Human interaction is still required.

It is possible to connect the wastewater tank to sewer inlet or other waste depository and leave the gate valve open. However, this allows solids to build up in the wastewater tank. If this is done repeatedly it can require that the wastewater tank be opened to remove the solids. This is a costly and unpleasant chore.

What is needed, therefore, is a system which can monitor the level of the wastewater tank and automate the task of emptying it without additional input by a human.

BRIEF SUMMARY OF THE INVENTION

The present invention provides an automated system and method which senses when the wastewater tank is full and automatically empties the tank and rinses without an occupant's input. The system can have one or more wastewater storage tanks. Each tank has a level sensor, an inlet and an outlet. Each tank may also be equipped with a rinse water nozzle and remotely operated valve. The rinse water valve is typically an electric operated valve, although other types of valves and valve operators may be used. The outlet has a drain valve, typically an electrically operated gate valve, although other types of remotely operated valves may be used.

A microcontroller operates the system on each tank. When the system is turned on to automatic mode it verifies the drain valve is closed. This is done by operating the drain valve in the closed direction.

When the level in the tank reaches a predetermined "full" level. The microcontroller receives a signal from the level sensor. If the system is equipped with more than one wastewater tank each tank has its own microcontroller. The microcontroller on the full tank confirms all of the drain valves on other tanks are closed. The microcontroller then operates the drain valve on the full tank to open that drain valve. It also sends out a command to lock out other controllers attached. If the full tank is equipped with a rinse water nozzle, there is a time delay before the microcontroller opens the rinse water valve. This sprays rinse water into the wastewater tank to help remove solids. Operation of the rinse water valve may also be delayed until the level in the tank drops below a predetermined level. The rinse water valve remains open for a predetermined amount of time. During the rinse cycle fluid levels of the holding are monitored to detect overflows due to gate valve failures or blockages. Once the time has expired, the rinse water valve is turned off. There is then a time delay between the turning off of the rinse water and the closing of the gate valve. The system then begins monitoring the level sensors again for a full tank.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
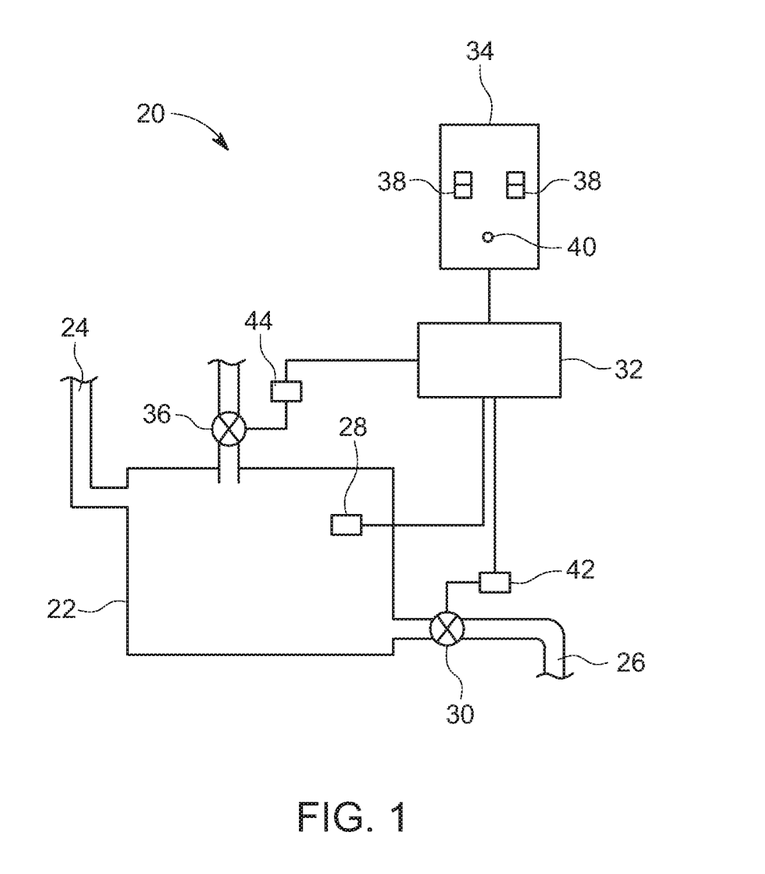
FIG. 1 is a piping and instrumentation diagram of the preferred embodiment of the present invention.

The present invention provides an automated system 20 and method which senses when the wastewater tank 22 is full and automatically empties the tank 22 without a user's input. Turning now to the drawings wherein like reference characters indicate like or similar parts throughout, FIG. 1 illustrates the present invention on an RV with a single wastewater tank 22. The tank 22 is in fluid communication with an inlet 24 and an outlet 26. The wastewater enters the tank 22 through the inlet 24. There is a level sensor 28 that indicates when the fluid level in the tank 22 reaches an upper limit, i.e. the tank 22 is full. There is an electrically operated drain valve 30 on the outlet 26. The drain valve 30 is opened to empty the tank 22. The drain valve 30 and level sensor 28 are connected to a controller 32, such as a printed circuit board with a microcontroller, an ARDUINO® controller, a RASPBERRY PI® controller or the like.

The system 20 may optionally include an electrically operated rinse water valve 36. If so equipped, the controller 32 starts the rinse cycle by opening the rinse water valve 36 following a time delay after opening the drain valve 30. This sprays rinse water into the tank 22 to help remove solids. The rinse water valve 36 remains open for a predetermined amount of time. Once that time expires, the controller 32 closes the rinse water valve 36. There is then a time delay between closing the rinse water valve 36 and closing the drain valve 30. Once this time delay expires the controller 32 closes the drain valve 30. Opening of the rinse water valve 36 may also be conditioned on a drop in the fluid level once the drain valve 30 is open. Further, the rinse valve 36 may be closed during the rinse cycle in the event the level sensor 28 detects a high or rising fluid level. This is determined by a signal sent by the level sensor 28 to the controller 32.

Figure 2:
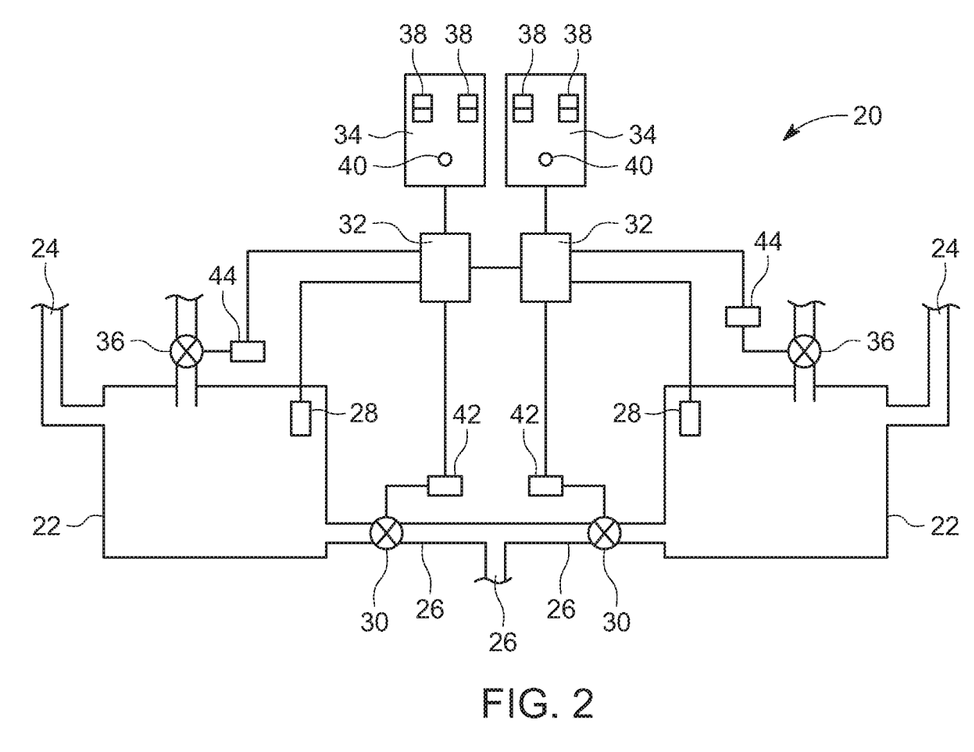
FIG. 2 is a piping and instrumentation diagram of the present invention in use on a multi-tank wastewater system.

FIG. 2 is a piping and instrument diagram for a two tank system. Each tank 22 in the two tank system has the same components as the tank 22 in the single tank system shown in FIG. 1. Control of the system 20 is done through a control panel 34. The exact location of the control panel 34 may vary depending upon the layout of the RV and the location of the various components of the systems 22.

In the preferred embodiment, the control panel 34 has a pair of rocker switches 38 for the tank 22, and a tri-colored LED indicator 40. The first rocker switch 38 of each pair allows the operator to; 1) Power the system ON or OFF. The second rocker switch 38 of each pair initiates a manual cleaning cycle on the system. The tri-colored indicator LED 40 displays the current status of the system. When in the OFF position, the LED 40 is dark—so the operator is not bothered by a glaring LED at night. The LED indicator 40 is also used to communicate problems with the system 30 and the length of the rinse cycle.

Figure 3:
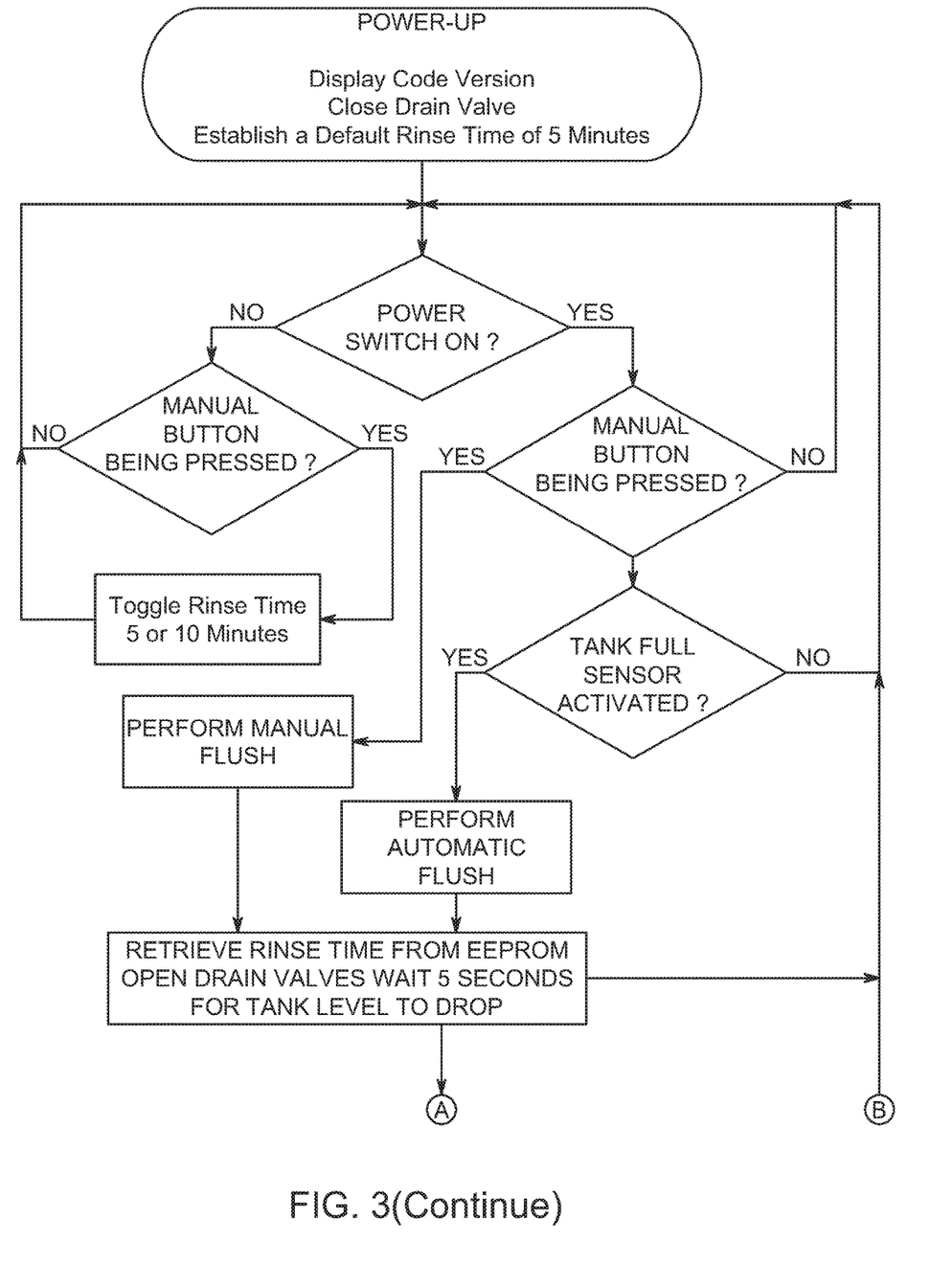
FIG. 3 is a flow chart of the operation of the preferred embodiment of the present invention.
Figure 4:
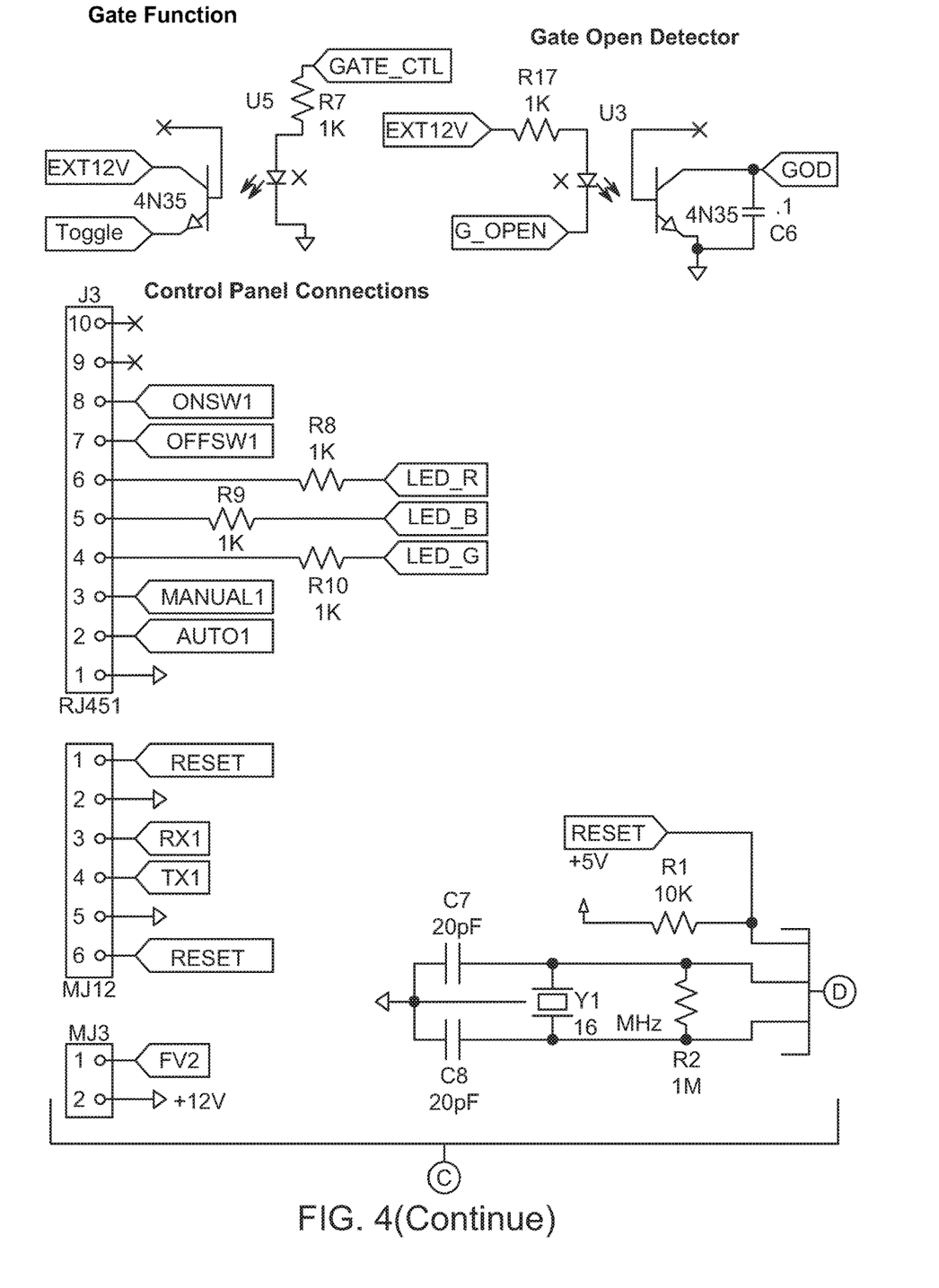
FIG. 4 is a schematic of the controller for the preferred embodiment of the present invention.
Figure 5:
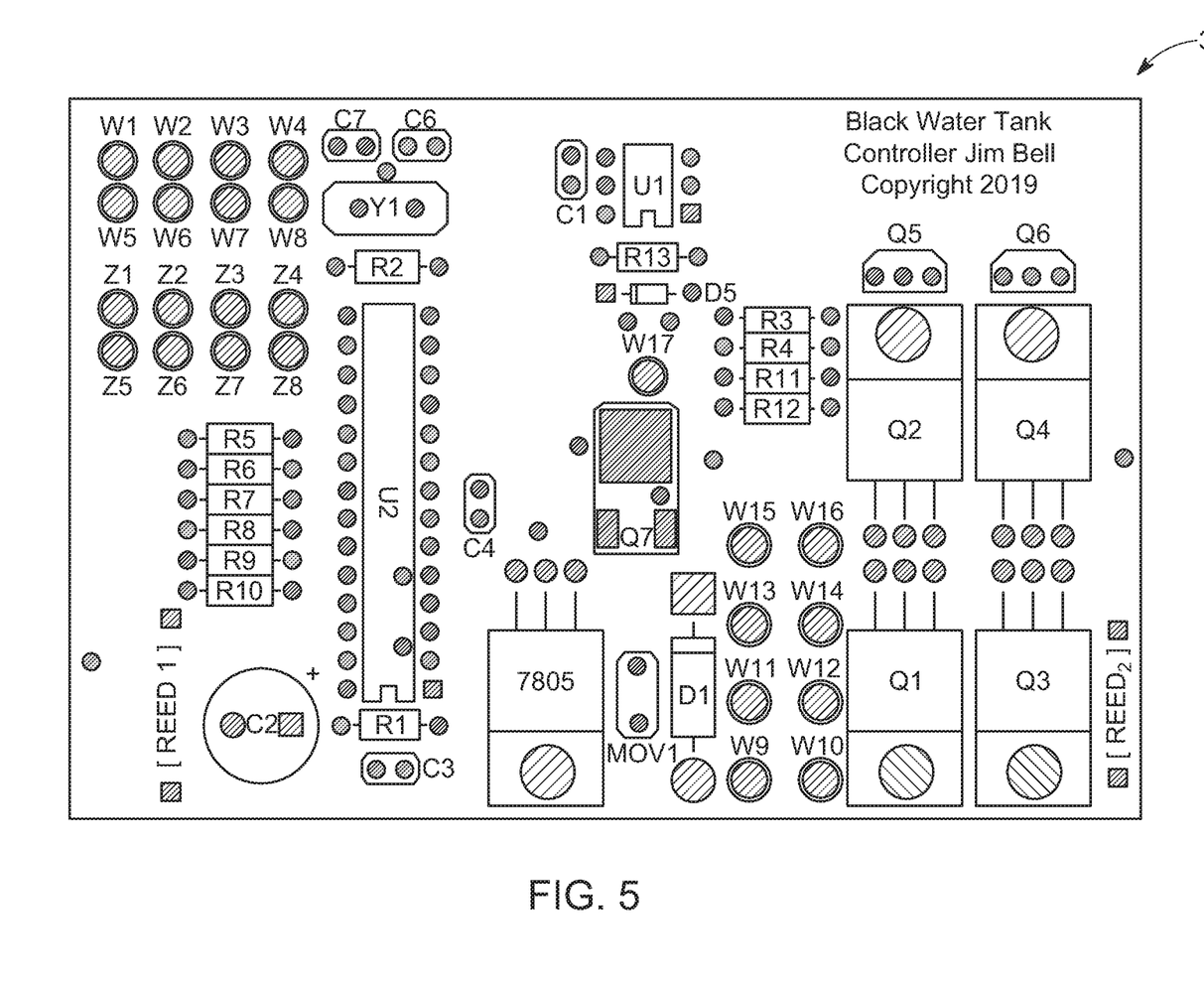
FIG. 5 is the layout of the printed circuit board of the preferred embodiment of the present invention.

FIG. 3 provides a flow chart of the operation of the system 20. Upon providing power to the system 20, i.e. powered up, the LED 40 signals the version of the operating code loaded on the controller 32. The system 20 also sends power to the operator 42 of the drain valve to ensure it is closed.

With power supplied the system 20 and the power rocker switch 38 in the on position, the system 20 is in the automatic mode and will continuously monitor for a signal from the level sensor 28. In automatic mode emptying of the wastewater tanks 22 is done automatically by the system 20 without further input from an operator.

When the fluid level in the tank 22 reaches a predetermined "full" level the level sensor 28 sends a signal to the controller 32. This causes the system 20 to open the drain valve 30 on the tank 22. The system 20 will delay opening the rinse water valve 36 until the time delay (typically five seconds) has expired and the level sensor 28 indicates the fluid level has dropped. Opening the rinse water valve 36 begins the rinse cycle and sends water into the tank 22 to assist in removing solids. When the predetermined length of time for the rinse cycle has expired (typically five or ten minutes), the system 20 will close the rinse water valve 36. There is then a time delay between the closing of the rinse water valve 36 and the closing of the drain valve 30, typically 30 seconds.

If the level sensor 28 senses a high fluid level after the time delay following the opening of the drain valve 30 and before opening the rinse water valve 36, the system 20 will abort the cycle, close the drain valve 30 and flash a warning code on the LED 40 such as red, green, blue in sequence or another unique combination.

If during the rinse cycle the level sensor 28 detects a high fluid level, the system 20 will terminate the cycle, close the drain valve 30 and the rinse water valve 26 and flash a warning code on the LED 40 such as a continuous blinking red or another unique combination to indicate there is a blockage.

A user can initiate a manual flush of a tank 22 by pressing the manual rocker switch 38 to the manual side with the system 20 powered up and the power rocker switch 38 in the on position. This takes the system 20 through the same sequence of events and safeguards as the automatic flush cycle which is initiated by the level sensor 28 with a high fluid level.

In the preferred embodiment the length of the rinse cycle is set to five minutes by default. It can be adjusted with the system 20 powered up and the power rocker switch 38 off. The rinse cycle time can then be toggled between five and ten minutes in length by depressing the manual rocker switch 38. The LED 40 will flash five times after the system 20 is toggled to a five minute rinse cycle or flash ten times after the system 20 is toggled to a ten minute rinse cycle.

Many RVs are now equipped with two or more tanks 22. FIG. 2 is a piping and instrumentation diagram for a two tank system. In this configuration each tank 22 has all of the components of a single tank system as illustrated in FIG. 1. In the dual tank system, outlets 26 of the tanks 22 are typically connected to one another downstream of their drain valves 30.

If both drain valves 30 are open at the same time the waste from one tank 22 can flow into the other tank 22. This can lead to cross contamination if one is a black water tank and the other is a gray water tank. It can also cause flooding under certain conditions. In order to avoid this problem, the controllers 32 of each tank 22 are interconnected. Prior to initiating a drain cycle the controllers 32 check with the other connected controller 32 to ensure the drain valve 30 on the second tank 22 is closed. If it is closed the first controller 32 will proceed with a drain cycle. This occurs in both the automatic and manual mode.

Figure 6:
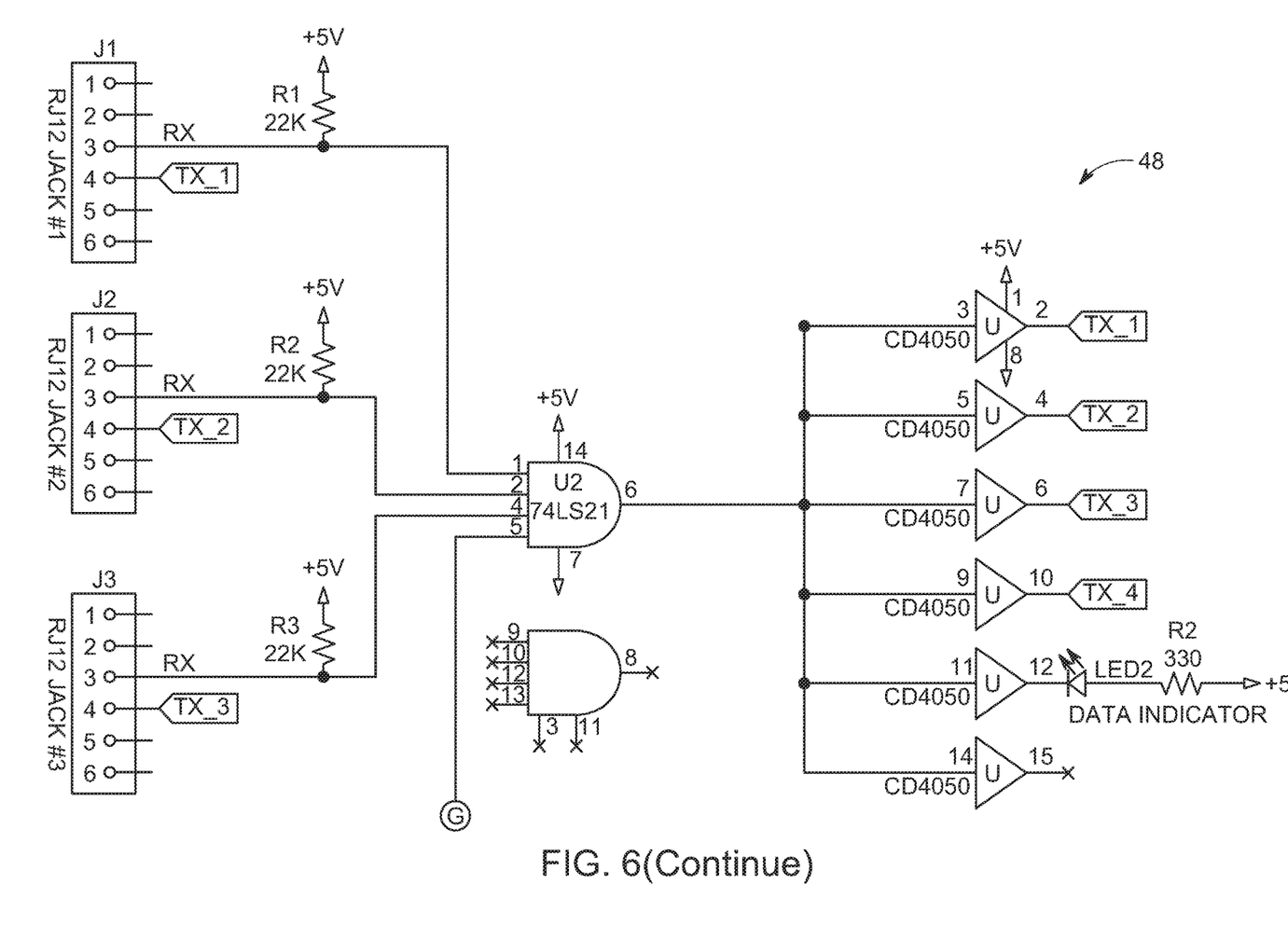
FIG. 6 is a schematic of an aggregator which allows three or more microcontrollers to communicate with one another for systems with three or more tanks.
Figure 7:
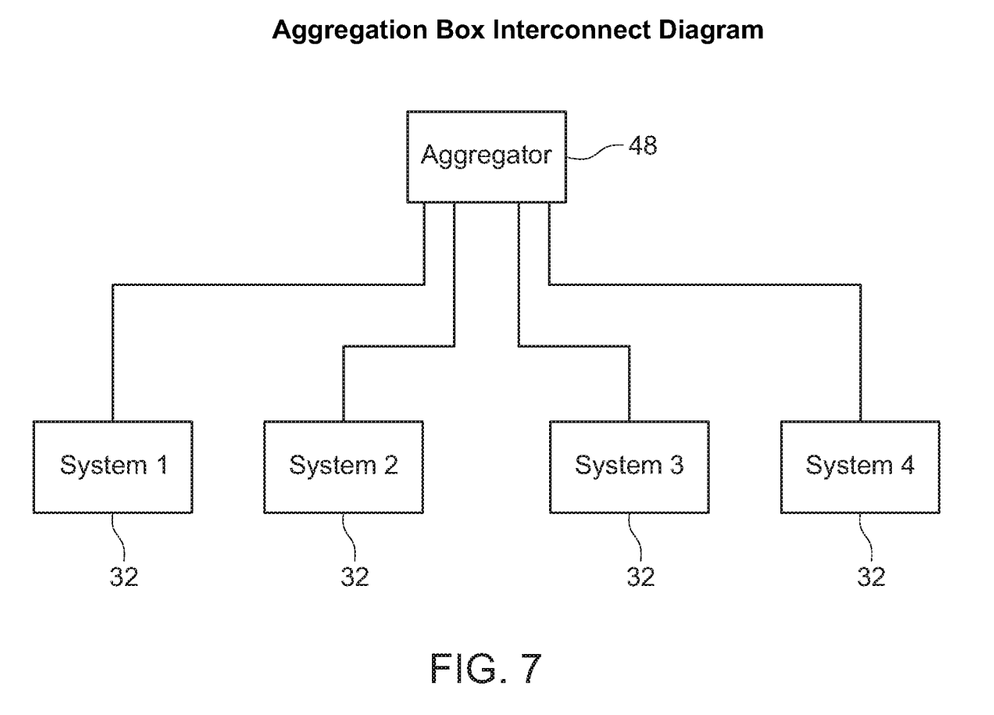
FIG. 7 is a schematic that shows an aggregator connecting multiple microcontrollers.

If the RV is equipped with three or more tanks 22, an aggregator 48 can be used to connect the communication of up to four controllers 32. FIG. 6 provides a schematic of an aggregator 48 with a plurality of input/output ports 52. FIG. 7 shows an aggregator connecting four controllers 32. The use of an aggregator 48 is necessary to provide additional input/output ports 52. In the preferred embodiment shown, the aggregator 48 is equipped with four input/output ports 52. However, the exact number of input/output ports 52 could vary depending upon requirements of the system 20. The aggregator 48 may be equipped with an LED indicator 54 for diagnostic purposes and for indicating whether the aggregator 48 is on.

The type of valves used for the drain valve 30 and rinse water valve 36 may vary depending upon the exact details of the wastewater system being controlled. The drain valve 30 is typically a gate valve. The rinse water valve 36 is typically a ball valve or globe valve. However, other types of valves may be used with this invention.

Similarly, the operation of the drain valve 30 and the rinse water valve 36 may be accomplished by various means. Various types of valve operators 42 can be used. The drain valve 30 is typically gate valve which is operated by an electrically driven gear drive. While the rinse water valve 36 is typically a ball valve or globe valve which is better suited to an operator 44 such as a solenoid. The exact configuration of the valve operators 42 and 44 will depend on the size of the valves, force required to operate the valves and the electric power available.

Further, the microcontroller may use a MOSFET or an H-Bridge 46 to provide power to the various valve operators 42 and 44. Use of a MOSFET or an H-Bridge 46 will depend on the power requirements of the valve operator 42 and 44.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An RV waste tank control system comprising:
   a first wastewater tank having an inlet, level sensor, an outlet with a drain valve and valve operator configured to open and close the drain valve, thereby draining the first wastewater tank; and
   a first controller configured to receive a signal from the level sensor and control the drain valve operator;
   wherein the first controller begins an automatic flush of the tank when the level sensor provides a signal to the controller when a fluid level in the first wastewater tank reaches a predetermined level and the controller then opens the drain valve via the valve operator and then closes the drain valve via the valve operator.

2. The system of claim 1 further comprising:
   a first rinse water valve with a valve operator configured to spray rinse water into the first wastewater tank;
   wherein the controller is configured to control the rinse water valve operator and during an automatic flush opens the rinse valve after a time delay following the level sensor providing the signal to the controller when the fluid level in the first wastewater tank reaches a predetermined level, the controller then closes the rinse water valve after a predetermined length of time and closes the drain valve after a time delay following closing the rinse water valve.

3. The system of claim 2 further comprising:
   a first control panel with a first and second rocker switch and an LED indicator;
   wherein the control panel is configured to operate the controller and the first rocker switch provides power to the controller when in the on position and the second rocker switch begins a manual flush of the tank when depressed thereby opening the drain valve.

4. The system of claim 3 further comprising:
   a second wastewater tank having an inlet, level sensor, an outlet with a drain valve and valve operator configured to open and close the drain valve, thereby draining the second wastewater tank; and
   a second controller in communication with the controller of the first wastewater tank and configured to receive a signal from the level sensor and control the drain valve operator of the second wastewater tank;
   wherein the second controller begins an automatic flush of the second wastewater tank when the level sensor of said tank provides a signal to the second controller when a fluid level in the second wastewater tank reaches a predetermined level and the controller then verifies the drain valve of the first wastewater tank is closed and opens the drain valve of the second wastewater tank via the valve operator and then closes the drain valve via the valve operator.

5. The system of claim 4 further comprising:
   a second rinse water valve with a valve operator configured to spray rinse water into the second wastewater tank;
   wherein the second controller is configured to control the second rinse water valve operator and during an automatic flush opens the second rinse valve after a time delay following the second level sensor providing the signal to the second controller when the fluid level in the second wastewater tank reaches a predetermined level, the second controller then closes the rinse water valve after a predetermined length of time and closes the drain valve after a time delay following closing the rinse water valve.

6. The system of claim 5 further comprising:
   a second control panel with a first and second rocker switch and an LED indicator;
   wherein the second control panel is configured to operate the second controller and the first rocker switch provides power to the second controller when in the on position and the second rocker switch begins a manual flush of the second wastewater tank when depressed thereby opening the drain valve.

7. The system of claim 4 further comprising:
   an aggregator with a plurality of input/output ports;
   wherein the first and second controller are in communication via the aggregator.

8. The system of claim 1 further comprising:
   an H-bridge;
   wherein the controller provides power to the drain valve operator via the H-bridge.

9. The system of claim 1 further comprising:
   an H-bridge,
   wherein the controller provides power to a rinse water valve operator via the H-bridge.

10. The system of claim 1 further comprising:
    a MOSFET;
    wherein the controller provides power to the drain valve operator via the MOSFET.

11. The system of claim 1 further comprising:
    a MOSFET,
    wherein the controller provides power to a rinse water valve operator via the MOSFET.

12. The system of claim 1, the drain valve comprising:
    a gate valve.

13. The system of claim 2, the rinse water valve comprising:
    a solenoid operated ball valve.

14. An RV waste tank control system comprising:
    a first and a second wastewater tank each having an inlet, level sensor, an outlet with a drain valve and valve operator configured to open and close the drain valve, thereby draining the respective wastewater tank;
    a first and a second controller each configured to receive a signal from their respective level sensor and control the drain valve operator on their respective wastewater tank; and a first and a second rinse water valve each with a valve operator in communication with their respective controller and configured to spray rinse water into their respective wastewater tank;

wherein each controller is configured to control the rinse water valve operator and drain valve operator; and wherein each controller begins an automatic flush of the tank when their respective level sensor provides a signal to the controller when a fluid level in its respective wastewater tank reaches a predetermined level, the controller then checks with the other controller to confirm the other drain valve is closed, the controller then opens its respective drain valve via the drain valve operator, if the controller receives a signal of a high fluid level from its respective level sensor the automatic flush is terminated, if no signal the controller then opens the rinse water valve for a predetermined length of time and closes the rinse water valve at the conclusion of the predetermined length of time, the controller then closes the drain valve via the valve operator following a time delay after the closing of the rinse water valve.

* * * * *